United States Patent
Moon

(10) Patent No.: US 10,007,325 B2
(45) Date of Patent: Jun. 26, 2018

(54) ELECTRONIC DEVICE, AUDIO DEVICE, AND METHODS OF CONTROLLING ELECTRONIC DEVICE AND AUDIO DEVICE POWER SUPPLY

(71) Applicant: SAMSUNG ELECTRONICS CO., LTD., Suwon-si (KR)

(72) Inventor: Young-hoon Moon, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 103 days.

(21) Appl. No.: 14/959,202

(22) Filed: Dec. 4, 2015

(65) Prior Publication Data

US 2016/0162015 A1  Jun. 9, 2016

(30) Foreign Application Priority Data

Dec. 5, 2014 (KR) .................. 10-2014-0174288

(51) Int. Cl.
| | | |
|---|---|---|
| *G06F 1/00* | (2006.01) | |
| *G06F 1/32* | (2006.01) | |
| *G06F 3/16* | (2006.01) | |
| *G08C 17/02* | (2006.01) | |
| *H04W 4/80* | (2018.01) | |
| *H04W 76/14* | (2018.01) | |

(52) U.S. Cl.
CPC ............ *G06F 1/3287* (2013.01); *G06F 3/165* (2013.01); *G08C 17/02* (2013.01); *H04W 4/80* (2018.02); *H04W 76/14* (2018.02); *G08C 2201/10* (2013.01)

(58) Field of Classification Search
CPC ....... G06F 1/3287; G06F 3/165; G08C 17/02; G08C 2201/10; H04W 76/023; H04W 4/008; H04N 7/06; H04N 5/4403
USPC ....................................................... 713/310
See application file for complete search history.

(56) References Cited

U.S. PATENT DOCUMENTS

| 8,320,832 B2 | 11/2012 | Kang et al. |
| 9,313,571 B2 | 4/2016 | Park et al. |
| 2009/0299541 A1 | 12/2009 | Park et al. |

(Continued)

FOREIGN PATENT DOCUMENTS

| CN | 101965690 A | 2/2011 |
| CN | 103002379 A | 3/2013 |

(Continued)

OTHER PUBLICATIONS

Communication dated Apr. 21 2016 issued by European Patent Office in counterpart European Patent Application 15197827.7.

(Continued)

*Primary Examiner* — Nitin Patel
(74) *Attorney, Agent, or Firm* — Sughrue Mion, PLLC

(57) ABSTRACT

Provided is an electronic device. The electronic device includes a communicator that wirelessly connects the electronic device to an external device, and a controller that controls the communicator and transmits a wake-up signal to the external device, in response to an input to turn on the power of the electric device, to instruct the external device in a standby state to initiate an audio output preparing operation. The standby state corresponds to a state in which the external device attempts to establish a connection.

10 Claims, 12 Drawing Sheets

(56) References Cited

U.S. PATENT DOCUMENTS

| | | | |
|---|---|---|---|
| 2010/0211698 A1* | 8/2010 | Krishnaswamy | H04W 4/003 710/11 |
| 2011/0077056 A1 | 3/2011 | Park et al. | |
| 2013/0064393 A1* | 3/2013 | Yamazaki | H04R 5/04 381/105 |
| 2014/0032004 A1 | 1/2014 | Park et al. | |
| 2014/0104990 A1 | 4/2014 | Shim | |
| 2015/0121227 A1* | 4/2015 | Peng | G06F 3/167 715/727 |
| 2015/0172906 A1* | 6/2015 | Terazaki | H04W 52/0216 455/434 |
| 2015/0181306 A1* | 6/2015 | Innes | G06F 17/28 725/74 |

FOREIGN PATENT DOCUMENTS

| | | |
|---|---|---|
| CN | 104142809 A | 11/2014 |
| EP | 2 723 005 A1 | 4/2014 |
| EP | 2 801 904 A2 | 11/2014 |
| KR | 10-2011-0033643 A | 3/2011 |

OTHER PUBLICATIONS

Communication dated Apr. 3, 2018, issued by the State Intellectual Property Office of P.R. China in counterpart Chinese Application No. 201510891139.4.

* cited by examiner

ELECTRONIC DEVICE, AUDIO DEVICE, AND METHODS OF CONTROLLING ELECTRONIC DEVICE AND AUDIO DEVICE POWER SUPPLY

CROSS-REFERENCE TO RELATED APPLICATION

This application claims priority from Korean Patent Application No. 10-2014-0174288, filed on Dec. 5, 2014 in the Korean Intellectual Property Office, the disclosure of which is incorporated herein by reference in its entirety.

BACKGROUND

1. Field

Apparatuses and methods consistent with exemplary embodiments relate to controlling a power supply of an electronic device and an audio device.

2. Description of the Related Art

BLUETOOTH® is a wireless communication protocol that builds personal area networks (PAN) by using 2.4 GHz, which is the industrial, scientific and medical (ISM) bandwidth, consumes a relatively small amount of power, and is designed to be used to configure a system at low cost.

To use BLUETOOTH® communication technology, it is necessary for a device to interpret BLUETOOTH® profiles. BLUETOOTH® profiles are definitions of possible applications and define general actions to be performed by a BLUETOOTH®-enabled device to communicate with another BLUETOOTH® device. There are BLUETOOTH® profiles of various types for describing applications of various types.

Examples of applications using BLUETOOTH® communication technology include wireless control and communication between a mobile phone and a hands-free headset, wireless control and communication between a mobile phone and a BLUETOOTH® car stereo system, wireless control and communication between a tablet personal computer (PC) and a speaker, wireless control and communication between a wireless BLUETOOTH® headset and an intercom, wireless communications between PC input/output devices, such as a mouse, a keyboard, and a printer, etc.

BLUETOOTH® and a local area wireless computer networking technology such as Wi-Fi have a plurality of similar applications for establishing a network and printing and transmitting files. Wi-Fi is intended to replace high-speed cable internet services for accessing a general local area network (LAN) in a work area, where applications corresponding to this category are occasionally referred to as wireless local area networks (WLAN). BLUETOOTH® is intended for mobile devices and applications thereof, where applications corresponding to this category are occasionally referred to as wireless personal area networks (WPAN).

Wi-Fi and BLUETOOTH® may be mutually complementary each other to some extent in terms of applications and usages. Wi-Fi is an access point-based technology having an asymmetrical client-server connection where most traffic is routed via access points. On the other hand, BLUETOOTH® is mostly symmetrical between two BLUETOOTH® devices. BLUETOOTH® works fine in simple applications in which two devices, e.g., a headset and a remote controller, need to be connected to each other with a minimal configuration, e.g., by pushing a button. Meanwhile, Wi-Fi is more suitable for applications in which clients may be configured to some extent and high-speed is demanded. Recently, Wi-Fi Direct technology has been developed to add ad-hoc functionality similar to that of BLUETOOTH® to Wi-Fi.

A display device may be wirelessly connected to an audio device via BLUETOOTH® or Wi-Fi for audio streaming. Generally, there is a time lag between an input from a user to turn on a display device and an actual output of sounds from an audio device. Furthermore, due to a time lag between an input from a user to turn on a display device and an actual output of sounds from an audio device, data loss may occur in audio data streamed from the display device to the audio device. Therefore, it may be necessary to reduce a time lag between the input from the user to turn on the display device and the actual output of sounds from the audio device that is wirelessly connected to the display device and to prevent loss of audio data streamed from the display device to the audio device.

SUMMARY

Exemplary embodiments address at least the above problems and/or disadvantages and other disadvantages not described above. Also, the exemplary embodiments are not required to overcome the disadvantages described above, and may not overcome any of the problems described above.

One or more exemplary embodiments provide methods of controlling an electronic device and an audio device to enable the audio device to initiate an audio output preparing operation in response to power of the electronic device and the audio device being turned on.

Further, one or more exemplary embodiments provide an electronic device, an audio device, and power supply control methods for outputting audio data with no time delay.

According to an aspect of an exemplary embodiment, there is provided an electronic device including: a communicator configured to wirelessly connect the electronic device to an external device, and a controller configured to control the communicator and transmit a wake-up signal to the external device, in response to an input to turn on the power of the electric device to instruct the external device in a standby state to initiate an audio output preparing operation of the external device. The standby state may correspond to a state in which the external device attempts to establish a connection.

In response to the input corresponding to power on of the electronic device, the controller may transmit the wake-up signal to the external device and initiate an operation of booting the electronic device.

When the external device is in the standby state, the controller may periodically receive connection request signals requesting a connection to the electronic device from the external device via the communicator.

When the electronic device is in a connectable state by completing an operation of booting, the controller may transmit a connection success signal to the external device in response to the connection request signals from the external device.

The controller may transmit audio data to the external device in response to the connection to the external device being established.

According to an aspect of another exemplary embodiment, there is provided an audio device including: a communicator configured to wirelessly connect the audio device to an electronic device; and a controller configured to control the communicator and instruct the audio device in a standby state to initiate an audio output preparing operation of the audio device in response to reception of a wake-up signal. The standby state may correspond to a state in which the audio device attempts to establish a connection.

In the standby state, the controller may periodically transmit connection request signals requesting a connection to the electronic device to the electronic device via the communicator.

In response to a connection success signal received in response to the connection request signals, the controller may output audio data received from the electronic device.

In response to a connection success signal received in response to the connection request signals, the controller may display a message, which notifies that the audio device is turned on, on a display of the audio device.

According to an aspect of another exemplary embodiment, there is provided a method of controlling an external device, by an electronic device, the method including: receiving an input that turns on the power of the electronic device; and transmitting a wake-up signal to the external device to instruct the external device in a standby state to initiate an audio output preparing operation. The standby state may correspond to a state in which the external device attempts to establish a connection.

The method may further include, in response to the input to turn on the power of the electronic device, transmitting the wake-up signal to the external device and initiating a booting operation of the electronic device.

The method may further include periodically receiving connection request signals requesting a connection to the electronic device from the electronic device via the communicator while the external device is in the standby state.

The method may further include, transmitting a connection success signal to the external device in response to the connection request signals from the electronic device when the electronic device is in a connectable state by completing an operation of booting.

The method further includes transmitting audio data to the external device in response to the connection to the external device being established.

According to an aspect of another exemplary embodiment, there is provided a method of controlling power of an audio device, the method including: receiving a wake-up signal from the electronic device while the audio device in a standby state; and initiating the audio output preparing operation in response to reception of the wake-up signal. The standby state may correspond to a state in which the audio device attempts to establish a connection The method may further include periodically transmitting connection request signals requesting a connection to the electronic device to the electronic device via the communicator while the audio device is in the standby state.

The method may further include outputting audio data received from the electronic device in response to a connection success signal being received in response to the connection request signals.

The method may further include displaying, on a display of the audio device, a message notifying that the audio device is turned on in response to a connection success signal being received in response to the connection request signals.

According to an aspect of another exemplary embodiment, there is provided a method of controlling a master communication device, the method including: receiving a power command that instructs the master communication device to enter a power-on state; booting an operation system of the mater communication device in response to the power command; generating a wake-up signal that instructs an external audio device in a standby state to initiate an audio output preparing operation; and transmitting the wake-up signal to the external audio device before the booting is completed.

The audio output preparing operation may include enabling an audio amplifier circuit of the audio device to be fully powered and stabled.

BRIEF DESCRIPTION OF THE DRAWINGS

The above and/or other aspects will be more apparent by describing certain exemplary embodiments, with reference to the accompanying drawings, in which.

DETAILED DESCRIPTION

Figure 1:
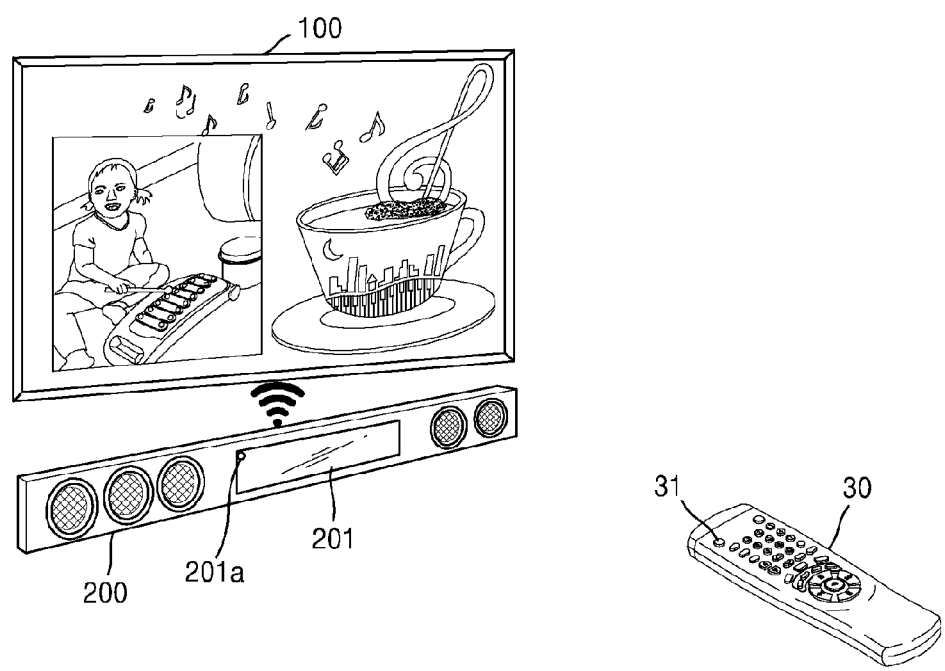
FIG. 1 is a schematic diagram showing operations performed among a remote control device, a display device, and an audio device.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention. As used herein, the term "and/or" includes any and all combinations of one or more of the associated listed items.

Selection of a key arranged on a remote control device may refer to pressing or touching the key.

Power OFF of a display device may refer to a state in which a power plug of the display device may be disconnected from a power source (e.g., a power outlet). If a display device has a power plug connected to a power source, power may be supplied to the display device (e.g., power ON) by manipulating a power key (or a power button) of the remote control device 30.

Power OFF of an audio device may refer to a state in which a power plug of the audio device may be disconnected from a power source (e.g., a power outlet).

Content may include videos, images, texts, or web documents.

The terms used in the present specification are merely used to describe particular exemplary embodiments, and are not intended to limit the present invention. An expression used in the singular encompasses the expression of the plural, unless it has a clearly different meaning in the context. In the present specification, it is to be understood that terms such as "including" or "having," etc., are intended to indicate the existence of features, numbers, steps, actions, components, parts, or combinations thereof disclosed in the specification, and are not intended to preclude the possibility that one or more other features, numbers, steps, actions, components, parts, or combinations thereof may exist or may be added.

FIG. 1 is a schematic diagram showing operations performed among a remote control device, a display device, and an audio device.

Referring to FIG. 1, a remote control device 30, a display device 100, and an audio device 200 wirelessly connected to the display device 100 are shown. The display device 100 may also be connected to the audio device 200 via wired communication.

The remote control device 30 may control the display device 100 and/or the audio device 200 via close-distance communication including infrared communication or BLUETOOTH® communication. Through operation by a user, the remote control device 30 may control functions of the display device 100 and/or the audio device 200 via at least one of keys (including buttons), a touch pad, a microphone capable of receiving a voice of the user, and a sensor capable of detecting motions of the remote control device 30, that are arranged in the remote control device 30. If power is supplied to the display device 100 under the control of the remote control device 30, the display device 100 may turn on an indicator on the front surface of a bezel. The turned-on indicator may be seen via the bezel.

If power is supplied to the audio device 200, the audio device 200 may supply power to a light source included in the audio device 200, so that a light may be emitted through an indicator window 201. If power is supplied to the audio device 200, the audio device 200 may output sound that is wirelessly received. Furthermore, if power is supplied to the audio device 200, the audio device 200 may supply power to an indicator 201a.

Furthermore, the audio device 200 may further include a woofer or an additional speaker connected to the audio device 200. The audio device 200 is shown in the form of a sound bar in FIG. 1. A sound bar is an audio device designed as a single bar-like device in which a woofer (a speaker for low audio frequencies) and a subwoofer (a speaker for super low audio frequencies) are horizontally arranged and is generally connected to a TV for sound enhancement. The sound bar type audio device 200 shown in FIG. 1 is merely one of various exemplary embodiments. The audio device 200 according to exemplary embodiments may have any of various configurations and shapes as long as the audio device 200 is capable of wirelessly communicating with the display device 100, receiving audio data from the display device 100, and outputting the audio data.

The remote control device 30 includes a power ON/OFF button 31 for turning the display device 100 on and off. The remote control device 30 may include a power ON/OFF button for turning the audio device 200 on and off. The remote control device 30 may also control the display device 100 to change channels, to adjust volume, to select ground wave broadcasting, cable broadcasting, and satellite broadcasting, or to change settings based on a user input. Furthermore, a user may use the remote control device 30 or another remote control device for controlling the audio device 200 to turn the audio device 200 on and off, to adjust volume, or to select a source.

From among audio, video, and/or additional information received from a channel selected at the display device 100, the display device 100 may output the audio via an internal speaker of the display device 100 or a speaker 275 (refer to FIG. 2) of the audio device 200, which is connected to the display device 100 via wired or wireless communication, based on the control of the remote control device 30.

The display device 100 may be embodied as a flat panel display device, or a curved display device having curved display screen or a flexible display device whose curvature may be adjusted. Furthermore, the display device 100 is not limited to display devices like TVs and may be embodied as electronic devices of various types that may be connected to the audio device 200 via a close-distance communication network.

Output resolutions of the display device 100 may include high definition (HD) resolution, full HD resolution, ultra HD resolution, or a resolution higher than the ultra HD resolution.

The internal speaker 176 of the display device 100 may be embodied in 2 channels, 2.1 channels, 4 channels, 4.1 channels, 5.1 channels, 6.1 channels, 7.1 channels, 9.1 channels, or 11.2 channels. However, the exemplary embodiments are not limited thereto.

In the present exemplary embodiment, the term 'user' refers to a person who controls functions or operations of the display device 100 by using the remote control device 30 and may include a user, a device manager, and an installation engineer.

When the display device 100 receives an input signal corresponding to power ON from the remote control device 30, the display device 100 may transmit a wake-up signal, which instructs the audio device 200 to perform an audio output preparing operation, to the audio device 200, which is in a standby state for attempting a connection to the display device 100.

Figure 2:
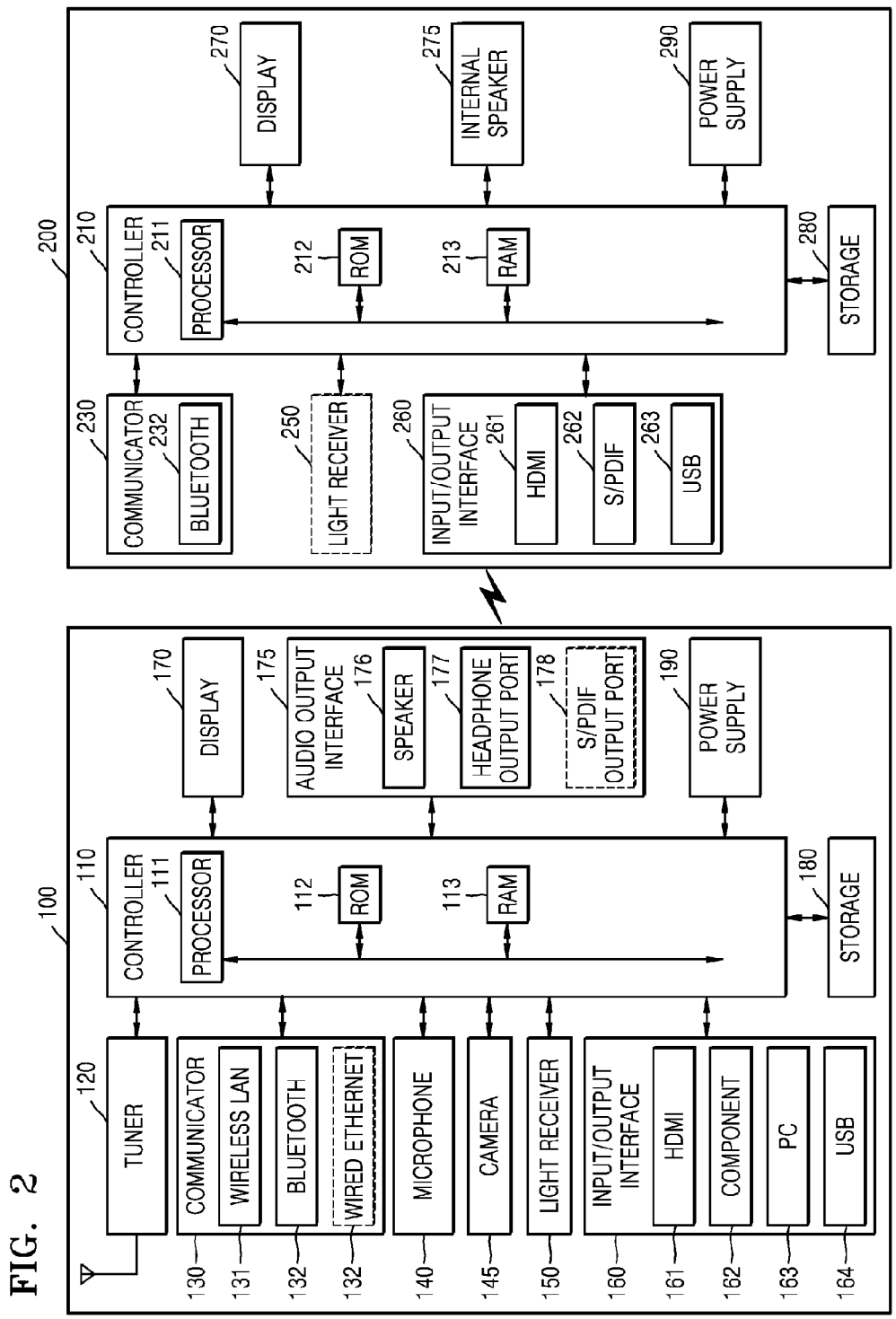
FIG. 2 is a block diagram showing a display device and an audio device according to an exemplary embodiment.

FIG. 2 is a block diagram showing a display device and an audio device 200 according to an exemplary embodiment.

Referring to FIG. 2, the display device 100 may receive a control signal from the remote control device 30 and may be connected to an external device via wired or wireless communication by using a communicator 130 or an input/output interface 160. The external device may include the audio device 200. The display device 100 may be referred to as an electronic device or a source device for wirelessly controlling an external device.

The external device refers to a device which may be wirelessly connected to the display device 100 (e.g., via BLUETOOTH®, close-distance communication, etc.) or a device which is wirelessly connected to the display device 100 and includes a speaker. For example, the external device may include a home theater, a wireless sound bar, a wireless headset, a wireless earphone, a mobile phone, a smart phone, a desktop personal computer (PC), a laptop PC, or a tablet PC. The external device may be referred to as a sink device that is wirelessly controlled by a source device.

One of ordinary skill in the art will understand that the present exemplary embodiment may be applied not only to the audio device 200 that is wirelessly connected to the display device 100, but also to an external device that is wirelessly connected to another external device.

Referring to FIG. 2, the display device 100 may include not only a display 170, but also a tuner 120, the communicator 130, and the input/output interface 160. The display device 100 may include not only a display 170, but also a combination of a tuner 120, the communicator 130, and the input/output interface 160. Furthermore, the display device 100 including the display 170 may be electrically connected to a separate external device (e.g., a set-top box) including a tuner. For example, the display device 100 may be embodied as an analog TV, a digital TV, a 3D TV, a smart TV, a light emitting diode (LED) TV, an organic light emitting diode (OLED) TV, a plasma TV, or a monitor. However, one of ordinary skill in the art will understand that the inventive concept is not limited thereto.

The display device 100 may include the tuner 120, the communicator 130, a microphone 140, a camera 145, a light receiver 150, the input/output interface 160, the display 170, an audio output interface 175, a storage 180, and a power supply 190. The display device 100 may include a sensor that detects an inside or outside condition of the display device 100 (e.g., an illuminance sensor, a temperature sensor, etc.)

The controller 110 may include a processor 111, a read-only memory (ROM) 112, which stores a control program for controlling the display device 100, and a random-access memory (RAM) 113, which stores signals or data input from outside the display device 100 or is used as a storage space corresponding to various tasks performed by the display device 100.

The controller 110 controls the overall operations of the display device 100, controls signal flows among internal components 120 through 190 of the display device 100, and processes data. The controller 110 controls power supplied by the power supply 190 to internal components 120 through 180. Furthermore, if there is a user input or a pre-set condition stored therein is satisfied, the controller 110 may execute an operating system (OS) and various applications stored in the storage 180.

The processor 111 may include a graphic processing unit (GPU) that processes graphics corresponding to images or videos. The processor 111 may be embodied as a system-on-chip (SOC) in which a core and a GPU are integrated into a single chip. The processor 111 may include a single core processor, a dual-core processor, a triple-core processor, a quad-core processor, or a multi-core processor.

Furthermore, the processor 111 may include a plurality of processors. For example, the processor 111 may include a main processor and a sub processor that operates in sleep mode. Furthermore, the processor 111, the ROM 112, and the RAM 113 may be connected to one another via an internal bus.

According to the present exemplary embodiment, the controller 110 of the display device 100 includes the processor 111, the ROM 112, and the RAM 113.

The controller 110 may control the light receiver 150 to receive a user input corresponding to power ON of display device 100 via at least one of the light receiver 150 that receives a light output by the remote control device 30, a panel key arranged on either a side surface or a rear surface of the electronic device, the microphone 140 that receives voices of a user, and the camera 145 that detects a motion of a user. A user input may also be referred to as a user operation, a user command, an input command, etc.

According to an exemplary embodiment, the controller 110 controls the communicator 130 wirelessly connected to the audio device 200 and, if an input corresponding to power ON of the display device 100 is received from the remote control device 30, the controller 110 may control the communicator 130 to transmit a wake-up signal, which instructs the audio device 200 to perform an audio output preparing operation, to the audio device 200 via the communicator 130. In other words, when the controller 110 receives a user input corresponding to power ON of the display device 100, the controller 110 may initiate an operation for booting the display device 100 by supplying power to components of the display device 100 by instructing the power supply 190 based on the user input and transmit a wake-up signal to the audio device 200 via the communicator 130. The user input corresponding to power ON may include a command that instructs the display device 100 to turn on its power.

By instructing the audio device 200 to initiate an audio output preparing operation without waiting until the display device 100 is booted via such a wake-up signal, the audio device 200 may complete a preparation for outputting audio data by the time the display device 100 is booted and may transmit audio data to the audio device 200. Therefore, since the audio device 200 initiates an audio output preparing operation simultaneously as an operation for booting the display device 100 is initiated instead of initiating an audio output preparing operation after the display device 100 is booted, when audio data is received from the display device 100, the audio data may be output without a delay.

According to an exemplary embodiment, when the controller 110 receives a user input corresponding to power ON of the display device 100, the controller 110 may control an indicator, which is turned on and off in correspondence to power ON and OFF of the display device 100, to be turned on in correspondence to power ON of the display device 100.

According to an exemplary embodiment, in a standby state of an external device attempting to connect to the display device 100, the controller 110 may periodically receive a connection request signal for requesting a connection to the display device 100 from the audio device 200 via the communicator 130.

According to an exemplary embodiment, when the display device 100 is booted and is in a connectable state to be connected to the audio device 200, the controller 110 may transmit a connection success signal to the audio device 200 via the communicator 130 in response to the connection request signal from the audio device 200.

According to an exemplary embodiment, the controller 110 may transmit audio data to the audio device 200 in response to completion of the connection to the audio device 200.

However, one of ordinary skill in the art will understand that configurations and operations of the controller 110 may vary according to exemplary embodiments.

The tuner 120 may amplify, mix, and resonate a broadcasting signal that is received via wired or wireless communication, thereby tuning and selecting a frequency of a channel to be received by the display device 100 from among a number of radio wave components. A broadcasting signal includes audio, video, and additional information (e.g., an electronic program guide (EPG)).

The tuner 120 may receive a broadcasting signal in a frequency band corresponding to a channel number (e.g., a cable broadcasting channel 506) based on a user input (e.g., a control signal received from the remote control device 30, such as an input of a channel number, a channel up or down input, and a channel input in an EPG screen).

The tuner 120 may receive broadcasting signals from various sources, such as a ground wave broadcast, a cable broadcast, a satellite broadcast, and an internet broadcast. The tuner 120 may receive broadcasting signals from sources including an analog broadcast and a digital broadcast. A broadcasting signal received via the tuner 120 is decoded (e.g., audio decoding, video decoding, or additional information decoding) and is split into audio, video, and/or additional information. The split audio, video, and/or additional information may be stored in the 180 under the control of the controller 110.

The display device 100 may include one or a plurality of tuners 120.

The tuner 120 may be integrated into the display device 100 or may be embodied as a separate device (e.g., a set-top box, a tuner connected to the input/output interface 160, etc.) having a tuner electrically connected to the display device 100.

The communicator 130 may connect the display device 100 to an external device (e.g., an audio device) under the control of the controller 110. The controller 110 may transmit/receive contents to/from the connected external device, download applications from the external device, or browse websites via the communicator 130. In correspondence to performance and structure of the display device 100, the communicator 130 may include one of a wireless LAN 131, a BLUETOOTH® 132, and an Ethernet 133. Furthermore, the communicator 130 may include a combination of the wireless LAN 131, the BLUETOOTH® 132, and the Ethernet 133. The communicator 130 may receive a remote control signal from the remote control device 30 under the control of the controller 110. A remote control signal may be embodied as a BLUETOOTH® type signal, a radio frequency (RF) type signal, or a Wi-Fi type signal.

The communicator 130 may include close-distance communication protocols other than BLUETOOTH®, such as near field communication (NFC), BLUETOOTH® low energy (BLE), etc.

According to an exemplary embodiment, when the controller 110 receives a user input corresponding to power ON of the display device 100 via the light receiver 150, the communicator 130 may transmit a wake-up signal, which instructs the audio device 200 to perform an audio output preparing operation, to the audio device 200, which is in a standby state for attempting a connection to the display device 100.

According to an exemplary embodiment, the communicator 130 may receive from the audio device 200 a connection request signal that requests a connection to the display device 100. The communicator 130 may transmit a connection success signal to the audio device 200 in response to the connection request signal.

According to another exemplary embodiment, the communicator 130 may transmit audio data to the audio device 200 in response to completion of a connection between the display device 100 and the audio device 200.

The microphone 140 receives an uttered voice of a user. The microphone 140 may transform the received voice into electric signals and output the electric signals to the controller 110. A user's voice may include a voice corresponding to a menu or a function of the display device 100. A recognition range of the microphone 140 may be within 4 m from the microphone 140 toward a location of a user, where the recognition range of the microphone 140 may vary based on loudness of the user's voice and surrounding environments (e.g., sounds from speakers, ambient noises, etc.)

The microphone 140 may be integrated with the display device 100 or may be embodied as a separate device. The separated microphone 140 may be electrically connected to the display device 100 via the communicator 130 and/or the input/output interface 160.

One of ordinary skill in the art will understand that the microphone 140 may be omitted based on performance and configuration of the display device 100.

The camera 145 captures images (e.g., successive frames) corresponding to a motion of a user including a gesture within a recognition range of the camera 145. For example, the recognition range of the camera 145 may be from about 0.1 m to about 5 m measured from the camera 145 toward a user. For example, a motion of a user may include a body part of the user, e.g., a face, a facial expression, a hand, a fist, a finger, etc., or a motion of a body part of the user. The camera 145 may transform the captured images into electric signals and output the electric signals to the controller 110 under the control of the controller 110.

The controller 110 may select a menu displayed at the display device 100 by using a result of recognizing the received motion or perform a control operation corresponding to the result of recognizing the received motion. For example, the control operation may include controlling channel selection, controlling volume, moving a cursor, and moving a cursor.

The camera 145 may include a lens and an image sensor. The camera 145 may provide an optical zoom or a digital zoom by using a plurality of lenses and an image processing algorithm. The recognition range of the camera 145 may vary according to an angle of the camera 145 and surrounding environment conditions. If there are a plurality of cameras 145, a 3-dimensional (3D) still image or a 3D motion may be received by using a second camera adjacent to the first camera 145 of the bezel 10 (e.g., a distance between the camera 145 and the second camera is greater than 2 cm and smaller than 8 cm).

The camera 145 may be integrated with the display device 100 or may be embodied as a separate device. A separate device including the separate camera 145 may be electrically connected to the display device 100 via the communicator 130 or the input/output interface 160.

One of ordinary skill in the art will understand that the microphone 140 may be omitted based on performance and configuration of the display device 100.

The light receiver 150 receives an optical signal from the external remote control device 30 via an optical window of the bezel 10. The light receiver 150 may receive an optical signal corresponding to a user input (e.g., a touch, a press, a touch gesture, a voice, or a motion) from the remote control device 30. A control signal may be extracted from the received optical signal under the control of the controller 110.

According to an exemplary embodiment, the light receiver 150 may receive an optical signal generated as a user presses the power ON/OFF button 31 of the remote control device 30, and a control signal corresponding to power ON/OFF may be extracted from the optical signal under the control of the controller 110.

The input/output interface 160 receives video (e.g., a moving picture), audio (e.g., a voice and a music), and additional information (e.g., an EPG) from outside the display device 100 under the control of the controller 110. The input/output interface 160 may include one of a high-definition multimedia interface (HDMI) port 161, a component jack 162, a PC port 163, and a universal serial bus (USB) port 164. The input/output interface 160 may include a combination of the HDMI port 161, the component jack 162, the PC port 163, and the USB port 164.

One of ordinary skill in the art will understand that configurations and operations of the input/output interface 160 may vary according to exemplary embodiments.

The display 170 displays video included in a broadcasting signal received via the tuner 120 under the control of the controller 110. The display 170 may display contents (e.g., moving pictures) input via the communicator 130 or the input/output interface 160. The display 170 may output images stored in the storage 180 under the control of the controller 110. Furthermore, the display 170 may include a voice user interface (UI) (including a voice command guide, for example) for performing a voice recognition task corresponding to voice recognition or a motion UI (including a user motion guide for motion recognition, for example) for performing a motion recognition task corresponding to motion recognition.

The display 170 according to an exemplary embodiment may output a visual feedback corresponding to power OFF or power ON of the display device 100 under the control of the controller 110 of the display device 100.

The audio output interface 175 outputs audio included in a broadcasting signal received via the tuner 120 under the control of the controller 110. The audio output interface 175 may output audio (e.g., a voice, a sound, etc.) input via the communicator 130 or the input/output interface 160. Furthermore, the audio output interface 175 may output audio stored in the storage 180 under the control of the controller 110. The audio output interface 175 may include at least one of the speaker 176, a headphone output port 177, and a Sony/Philips digital interface format (S/PDIF) output port 178. The audio output interface 175 may include a combination of the speaker 176, the headphone output port 177, and the S/PDIF output port 178.

The audio output interface 175 according to an exemplary embodiment may output audio feedback corresponding to power ON or power OFF of the display device 100 under the control of the controller 110 of the display device 100.

The storage 180 may store various data, programs, or applications for operating and controlling the display device 100 under the control of the controller 110. The storage 180 may store signals or data input or output in correspondence to operations of the tuner 120, the communicator 130, the microphone 140, the camera 145, the light receiver 150, the input/output interface 160, the display 170, the audio output interface 175, and the power supply 190. The storage 180 may store control programs for controlling the display device 100 and the controller 110, applications initially provided by a manufacturer or downloaded from outside, graphical user interfaces (GUI) related to the applications, objects for providing the GUI (e.g., image texts, icons, buttons, etc.), user information, documents, databases (DBs), or related data.

According to an exemplary embodiment, the term storage includes the storage 180, the ROM 112, the RAM 113, or a memory card (e.g., a micro secure digital (SD) card, a USB memory, etc.) attached to the display device 100. Furthermore, the storage 180 may include a non-volatile memory, a volatile memory, a hard disk drive (HDD), or a solid state drive (SSD).

The storage 180 may include a broadcasting receiving module, a channel control module, a volume control module, a voice recognition module, a motion recognition module, a light receiving module, a display control module, an audio control module, an external input control module, a power control module, a module for controlling power of an external device connected wirelessly (e.g., via BLUETOOTH®), a voice DB, or a motion DB. The modules and the DBs of the storage 180 may be embodied in the form of software for performing a broadcasting reception control function, a channel control function, a volume control function, a communication control function, a voice recognition function, a motion recognition function, a light reception control function, a display control function, an audio control function, an external input control function, a power control function, or a function for controlling power of a wirelessly connected external device (e.g., via BLUETOOTH®) at the display device 100. The controller 110 may perform the functions by using the respective software stored in the storage 180.

The storage 180 may store profiles of the display device 100 corresponding to power ON/OFF of the audio device 200.

The storage 180 may store a profile of the display device 100 corresponding to audio streaming of the audio device 200.

The storage 180 may store a user input (e.g., a user input corresponding to power OFF or power ON) received via one of the light receiver 150, a panel key, the microphone 140, and the light receiver 150.

The storage 180 may store wireless connection log and/or history between the display device 100 and the audio device 200 (e.g., device information regarding the display device 100 and the audio device 200, a number of times connected, dates connected, times connected, etc.).

The storage 180 may store images, symbols, and/or texts that may be displayed on the display 170.

The storage 180 may store a moving picture or an image corresponding to a visual feedback.

The storage 180 may store a sound corresponding to an audio feedback.

The power supply 190 supplies power input from an external power source to the components 120 through 180 inside the display device 100 under the control of the controller 110. Furthermore, the power supply 190 may supply power output by one or two or more batteries arranged in the display device 100 to the components 120 through 180 inside the display device 100 under the control of the controller 110.

When the controller 110 receives an input corresponding to power ON of the display device 100 via the light receiver 150, the power supply 190 may perform a booting operating by supplying power to the components inside the display device 100 under the control of the controller 110.

Based on performance of the display device 100, at least one component may be added to or omitted from the components based on performance and configuration of the display device 100 of the display device 100 (e.g., the components 120 through 190) shown in FIGS. 1 and 2. Furthermore, one of ordinary skill in the art will understand that locations of the components (e.g., the components 120 through 190) may be changed based on performance or structure of the display device 100.

Referring to FIG. 2, the audio device 200 is wirelessly connected to the display device 100 via the communicator unit 230 (e.g., via the BLUETOOTH® 232). The audio device 200 may output audio received from the wirelessly connected display device 100.

The audio device 200 may include a controller 210, a communicator 230, a light receiver 250, an input/output interface 260, a display 270, the internal speaker 275, and a storage 280 or a power supply 290.

The controller 210 includes a processor 211. The controller 210 may include the processor 211 and a ROM 212 having stored therein a control program for controlling the audio device 200. Furthermore, the controller 210 may include the processor 211, the ROM 212, and a RAM 213, which stores signals or data input from outside the audio device 200 or is used as a storage space corresponding to various tasks performed by the audio device 200. Furthermore, the processor 211, the ROM 212, and the RAM 213 may be connected to one another via the internal bus.

The controller 210 may include an audio codec.

The controller 210 controls the overall operations of the display device 100, controls signal flows among internal components 230 through 280 of the audio device 200, and processes data. The controller 210 controls power supplied by the power supply 290 to the internal components 230 through 280.

The controller 210 may output received audio via the internal speaker 275. Furthermore, the controller 210 may output received audio via an additional speaker connected via the communicator 230 or the input/output interface 260.

The controller 210 may control the communicator 230 wirelessly connected to the display device 100 and control the audio device 200 to initiate an audio output preparing operation in response to a wake-up signal received from the display device 100 via the communicator 230. In other words, when a wake-up signal is received via the communicator 230, the controller 210 may control the power supply 290 to supply power to the internal speaker 275 to warm up the internal speaker 275. Such speaker warm-up times of speaker devices may vary from about 1 second to about 3 seconds. According to the present exemplary embodiment, such a speaker warm-up is performed before booting of a display device is completed, and thus audio data may be output without a delay when the audio data is received from the display device.

The controller 210 may control one of an indicator and a lamp to be turned off after a display device is turned off.

The controller 210 may control the communicator 230 to perform at least one of an inquiry and a connection request to the display device.

One of ordinary skill in the art will understand that configurations and operations of the controller 210 may vary according to exemplary embodiments.

The communicator 230 may be wirelessly connected to the display device 100 under the control of the controller 210. The communicator 230 includes the BLUETOOTH® 232 and may further include other close-distance communication protocols (e.g., near field communication (NFC), BLUETOOTH® low energy (BLE, etc.). The communicator 230 may receive a remote control signal (including a control signal) of the remote control device 30 under the control of the controller 210. The remote control signals may be embodied as a BLUETOOTH® type signal or a RF type signal.

The controller 210 may receive various audios from a display device connected via the communicator 230.

The light receiver 250 receives an optical signal (including a control signal) from the remote control device 30 via an optical window. The light receiver 250 may receive an optical signal corresponding to a user input (e.g., a touch, a press, a touch gesture, a voice, or a motion) from the remote control device 30. The received optical signal may be transformed and transmitted to the controller 210. Furthermore, a control signal may be extracted from the received optical signal under the control of the controller 210.

The input/output interface 260 may receive audio (e.g., sounds, music, etc.) from an external device under the control of the controller 210. Furthermore, the input/output interface 260 may output audio (e.g., sounds, music, etc.) to an external device under the control of the controller 210.

The input/output interface 260 may include one of a high-definition multimedia interface (HDMI) port 261, a S/PDIF port 262, or a USB port 263. One of ordinary skill in the art will understand that configurations and operations of the input/output interface 260 may vary according to embodiments.

The display 270 may display video or text information (e.g., title of a song) under the control of the controller 210. For example, the display 270 may include a liquid crystal display (LCD), an OLED, a plasma display panel (PDP), or a vacuum fluorescent display (VFD). One of ordinary skill in the art will understand that different video and/or text information may be displayed based on type of the display 270.

The display 270 may display a text, an icon, or a symbol (e.g., ▶ corresponding to playback and ■ corresponding to stop) corresponding to an external device wirelessly connected to the audio device 200 (e.g., the display device 100, a portable terminal, a memory card, or the remote control device 30) under the control of the controller 210.

When a USB memory is connected to the audio device 200 via the USB port 263, the display 270 may display a text such as, for example, 'USB ready' or 'name of playable music,' under the control of the controller 210.

If the display device 100 or a portable terminal is connected to the audio device 200 via a close-distance communication protocol, the display 270 may display a text such as 'BT connected' or 'NFC connected' under the control of the controller 210.

Furthermore, if an optical signal output by the remote control device 30 is received by the light receiver 250 of the audio device 200, the display 270 may display texts, icons, or symbols corresponding to power ON for turning on the audio device 200, power OFF for turning off the audio device 200, or Vol+/− for adjusting volume.

A text, an icon, or a symbol displayed at the display 270 may be moved in a direction under the control of the controller 210. Furthermore, a text, an icon, or a symbol displayed at the display 270 may flicker and be moved at the same time in a direction under the control of the controller 210.

When the audio device 200 is turned on or off, the display 270 may display a visual feedback (e.g., a text, an icon, or a symbol) corresponding to power supply under the control of the controller 210.

The display 270 may display a visual feedback corresponding to an event of the audio device 200 (e.g., a status change of the audio device 200 like power ON, power OFF, and a connection to a portable terminal) under the control of the controller 210 of the audio device 200.

The internal speaker 275 outputs audio received from the display device 100 under the control of the controller 210. The internal speaker 275 may output audio (e.g., voices, music, and sounds) received via the communicator 230 or the input/output interface 260. The internal speaker 275 may be embodied in 1 channel, 2 channels, or 2.1 channels. Furthermore, the internal speaker 275 may be embodied in 4 channels, 4.1 channels, 5.1 channels, 6.1 channels, 7.1 channels, 9.1 channels, or 11.2 channels. However, the exemplary embodiment is not limited thereto.

The controller 210 may up-mix received audio (e.g., 2.0 channels) and output via 4 channel speakers, 5 channels speakers, 5.1 channel speakers, or 7.1 channel speakers (using the internal speaker 275 and additional speakers). Furthermore, the controller 210 may down-mix received audio (7.1 channels) and output via 2 channel speakers, 2.1 channel speakers, or 5.1 channel speakers. Furthermore, the controller 210 may output received audio by considering a total number of the internal speaker 275 and additional speakers corresponding to the audio. For example, if a number of speakers corresponding to the received audio is 5.1 channels, the controller 210 may output the received audio in 5.1 channels in consideration of an internal speaker 155 (e.g., 2.1 channels) of the detected display device 100 and additional speakers (e.g., 3 channels).

The controller 210 may provide various audio output effects (e.g., concert hall effect, orchestra hall effect, etc.) in correspondence to a number of the internal speakers 275. Furthermore, the controller 110 may provide various audio output effects (e.g., concert hall effect, orchestra hall effect, etc.) in correspondence to a total number of the internal speakers 275 and additional speakers connected via the input/output interface 260.

The internal speaker 275 may also output audio stored in the storage 280 under the control of the controller 210. Furthermore, the audio device 200 may output audio to an external device via the input/output interface 260. For example, the controller 210 may output audio to additional speakers.

The internal speaker 275 according to an exemplary embodiment may output an audio feedback corresponding to an event of the audio device 200 (e.g., a status change of the audio device 200 like power ON, power OFF, and a connection to a portable terminal) under the control of the controller 210 of the audio device 200. Furthermore, the internal speaker 275 may output an audio feedback corresponding to a text, an icon, or symbol displayed at the display 270 under the control of the controller 210 of the audio device 200.

The storage 280 may store various data and control programs for operating and controlling the audio device 200 under the control of the controller 210. The storage 280 may store signals or data input/output in correspondence to operations of the communicator 230, the light receiver 250, the input/output interface 260, the display 270, the internal speaker 275, and the power supply 290.

The storage 280 may include a non-volatile memory, a volatile memory, a hard disk drive (HDD), or a solid state drive (SSD).

The storage 280 may store profiles of the display device 100 corresponding to power ON/OFF of the audio device 200.

The storage 280 may store a profile of the display device 100 corresponding to audio streaming of the audio device 200.

The storage 280 may store a packet corresponding to an inquiry of the display device 100.

The storage 280 may store a packet corresponding to a connection request of the display device 100.

The storage 280 may store images, symbols, and/or texts that may be displayed at the display 270.

The storage 280 may store a moving picture or an image corresponding to a visual feedback or a sound corresponding to an audio feedback.

The power supply 290 supplies power input from an external power source to the components 230 through 280 inside the display device 200 under the control of the controller 210. Furthermore, the power supply 290 may supply power output by one or two or more batteries arranged in the display device 200 to the components 220 through 280 inside the display device 200 under the control of the controller 210.

According to an exemplary embodiment, when the controller 210 receives a wake-up signal from the display device 100 via the communicator 230, the power supply 290 may supply power to warm up a component, such as the internal speaker 275, to be prepared to output audio under the control of the controller 210.

Based on performance of the audio device 200, at least one component may be added to or omitted from the components based on performance and configuration of the audio device 200 of the audio device 200 (e.g., the components 230 through 280) shown in FIGS. 1 and 2. Furthermore, the disposition of the components 230 through 280 may be changed based on performance or structure of the audio device 200.

Figure 3:
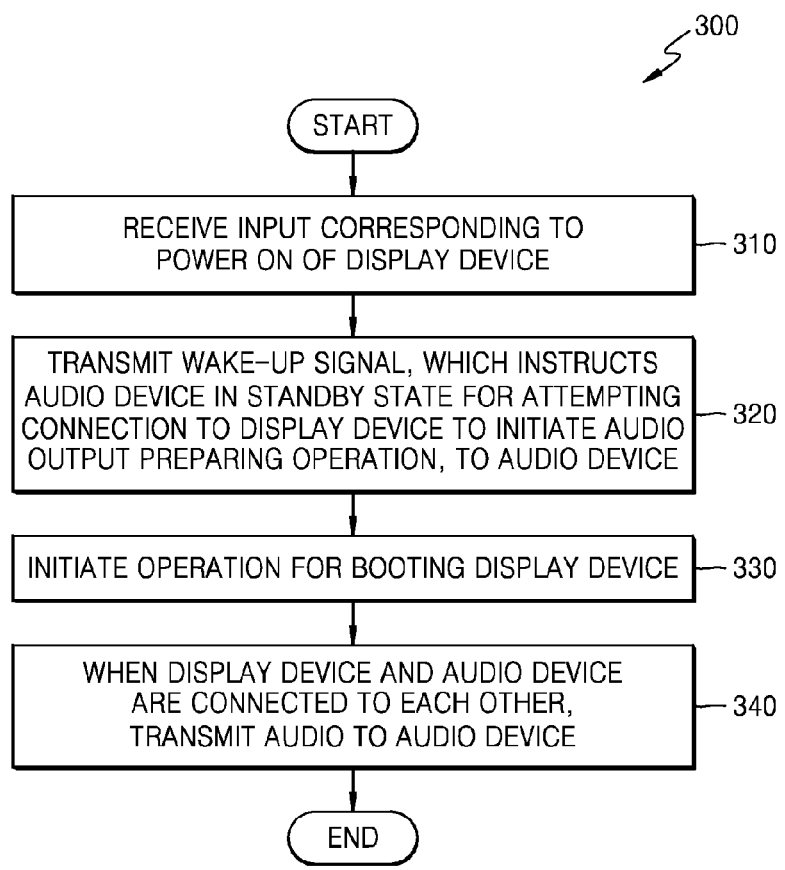
FIG. 3 is a schematic flowchart showing operations of the display device for controlling the audio device.

FIG. 3 is a schematic flowchart showing operations of the display device 100 for controlling the audio device 200.

In operation 310 of FIG. 3, the display device 100 receives an input corresponding to power ON of the display device 100.

Referring to FIGS. 1 and 2, when a user presses the power on/off button 31 of the remote control device 30 when the display device 100 is in power OFF state, the light receiver 150 of the display device 100 may receive an optical signal from the remote control device 30, and the controller 110 may extract a signal corresponding to power ON from the optical signal.

In operation 320, the display device 100 transmits a wake-up signal, which instructs the audio device 200 to initiate an audio output preparing operation, to the audio device 200, which is in a standby state for attempting a connection to the display device 100.

Referring to FIGS. 1 and 2, according to an exemplary embodiment, the controller 110 of the display device 100 performs an operation of waking up the audio device 200 in response to a signal corresponding to power ON of the display device 100. In other words, under the control of the controller 110, the communicator 130 may transmit a wake-up signal, which instructs the audio device 200 to initiate an audio output preparing operation, to the audio device 200, which is in a standby state for attempting a connection to the display device 100. In related art, when a signal corresponding to power ON is detected, a display device only performs a power ON operation, that is, a booting operation. However, according to an exemplary embodiment, the display device 100 transmits a wake-up signal to wake up the audio device 200 while processing a startup sequence that starts the operating system of the display device 100.

In operation 330, the display device 100 starts an operation of booting the display device 100.

Referring to FIGS. 1 and 2, according to an exemplary embodiment, the power supply 190 initiates an operation of booting the display device 100 by supplying power to respective components of the display device 100 under the control of the controller 110.

In operation 340, when the display device 100 and the audio device 200 are connected to each other, the display device 100 transmits audio data to the audio device 200.

Referring to FIGS. 1 and 2, when the display device 100 and the audio device 200 are connected to each other by completing the booting of the display device 100, the communicator 130 transmits audio data to the audio device 200 under the control of the controller 110. Detailed descriptions of the operation for connecting the display device 100 and the audio device 200 to each other will be given below with reference to FIGS. 10 through 12.

Figure 4:
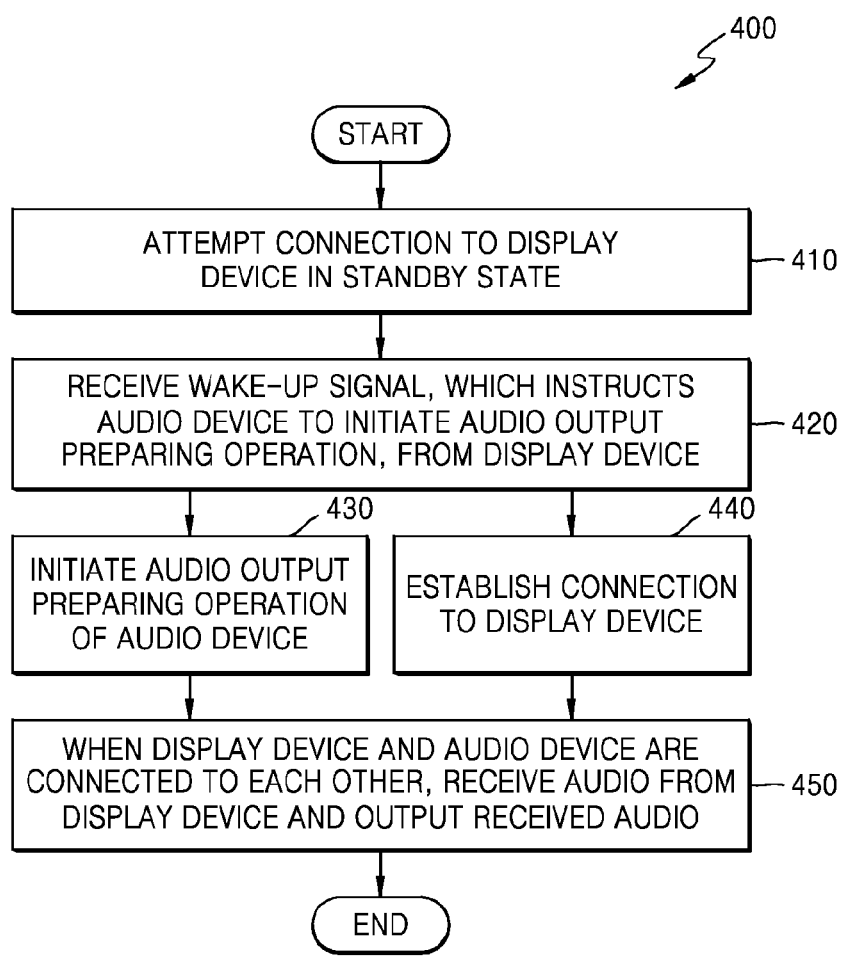
FIG. 4 is a schematic flowchart showing a method of controlling power in the audio device operated under the control of the display device, according to an exemplary embodiment.

FIG. 4 is a schematic flowchart 400 showing a method of controlling power in the audio device 200 operated under the control of the display device 100, according to an exemplary embodiment.

In operation 410 of FIG. 4, the audio device 200 attempts to be connected to the display device 100 in a standby state.

For example, the standby state may refer to a state in which, although components of the audio device 200 for audio output or data input/output are in an OFF state, a portion of the controller 210 and the communicator 230 are in an ON state to communicate with an external device (e.g., the display device 100), or only the communicator 230 is in the ON state to communicate with the external device.

Referring to FIGS. 1 and 2, when the audio device 200 is in the standby state, at least portions of the communicator 230 and the controller 210 of the audio device 200 are not turned off, and the communicator 230 continuously attempts a connection to the display device 100 under the control of the controller 210. The audio device 200 may have performed a BLUETOOTH® pairing with the display device 100 before the audio device 200 enters the standby state, and thus the audio device 200 may have information regarding the display device 100. Therefore, the communicator 230 may attempt a connection to the display device 100 in the standby state. The RAM 213 may maintain power in the standby state to keep the information of the display device 100.

In operation 420, the audio device 200 receives the wake-up signal, which instructs the audio device 200 to initiate an audio output preparing operation, from the display device 100.

According to an exemplary embodiment, referring to FIGS. 1 and 2, the communicator 230 of the audio device 200 may receive the wake-up signal from the display device 100 under the control of the controller 210.

In operation 430, the audio device 200 initiates an audio output preparing operation.

According to an exemplary embodiment, referring to FIGS. 1 and 2, the controller 210 instructs the audio device 200 to perform an audio output preparing operation in response to the wake-up signal being received via the communicator 230. In other words, the controller 210 may perform an audio output preparing operation by warming up the components of the audio device 200 including the internal speaker 275 by controlling the power supply 290 to supply power to the components of the audio device 200.

In operation 440, the audio device 200 establishes a connection to the display device 100.

Referring to FIGS. 1 and 2, when the display device 100 is booted and is in a connectable state to be connected to the audio device 200, the communicator 230 of the audio device 200 establishes a connection to the display device 100 under the control of the controller 210.

In operation 450, when the display device 100 and the audio device 200 are connected to each other, the audio device 200 receives audio from the display device 100 and outputs the received audio.

Referring to FIGS. 1 and 2, when the display device 100 and the audio device 200 are connected to each other, the communicator 230 may receive audio data from the display device 100 under the control of the controller 210, and the internal speaker 275 may output the received audio data under the control of the controller 210.

Figure 5:
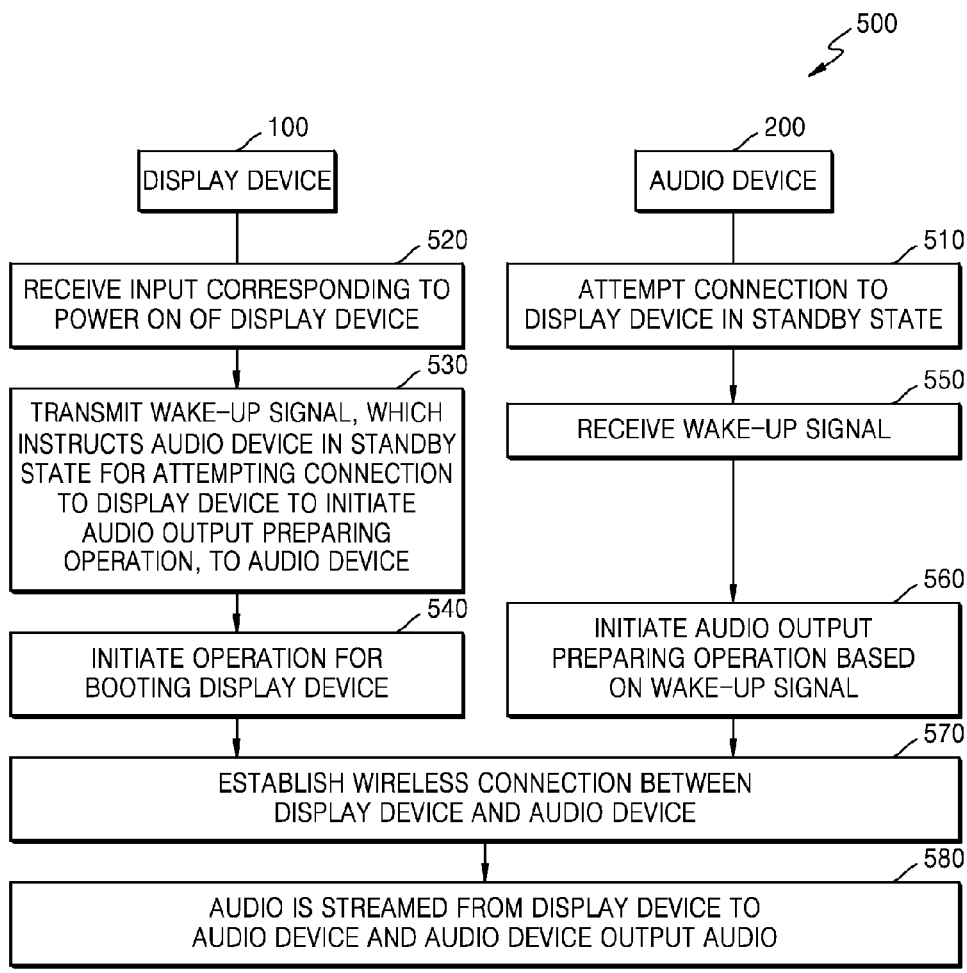
FIG. 5 is a schematic flowchart showing a method whereby a display device controls an audio device according to an exemplary embodiment.

FIG. 5 is a schematic flowchart 500 showing a method that a display device controls an audio device according to an exemplary embodiment.

Figure 6:
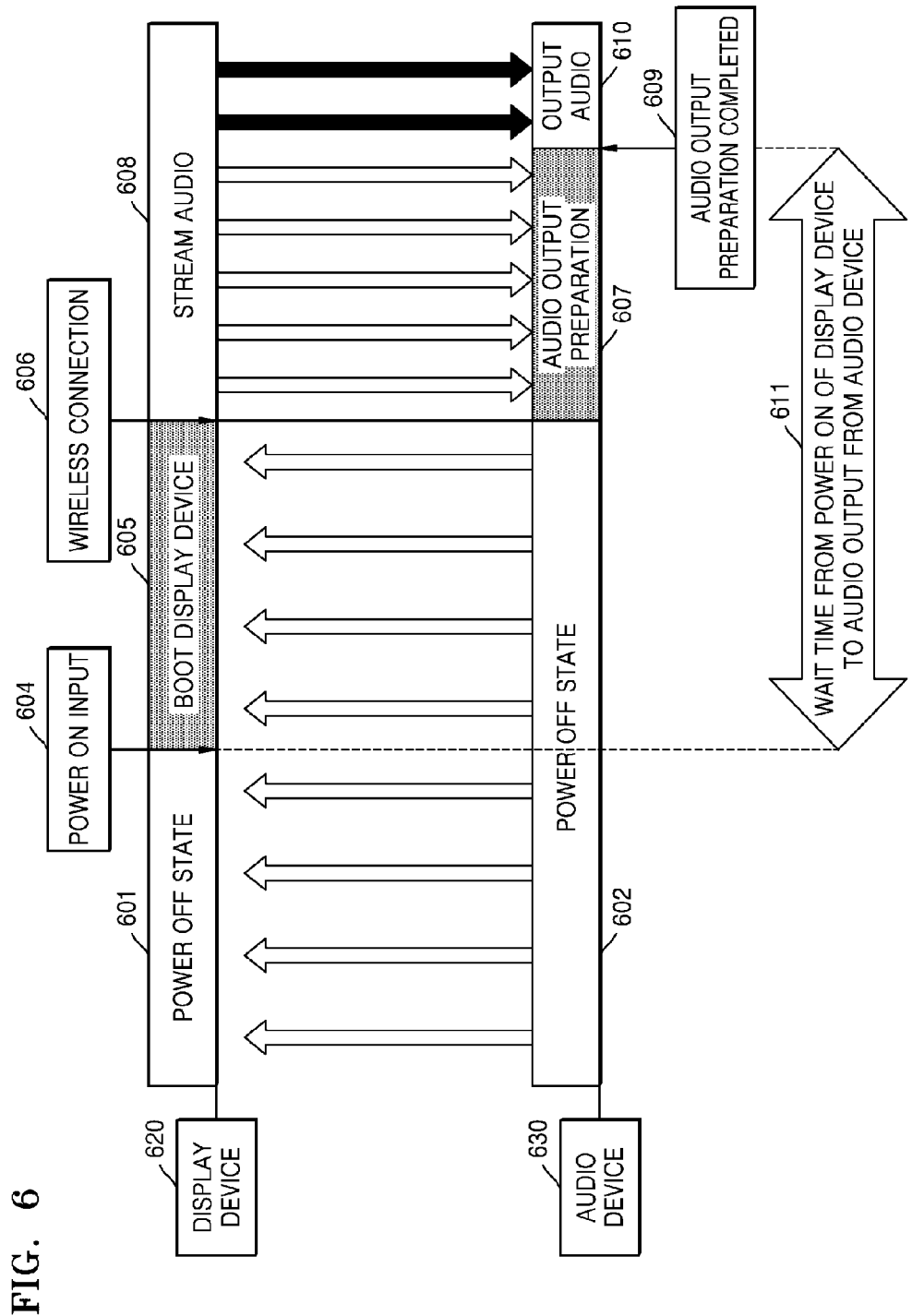
FIG. 6 is a diagram showing a delay time from power ON of a display device to audio output of an audio device in a case in which a wake-up signal according to an exemplary embodiment is not applied.

FIG. 6 is a diagram showing a delay time from power ON of a display device to audio output of an audio device in the case in which a wake-up signal according to an exemplary embodiment is not applied.

Figure 7:
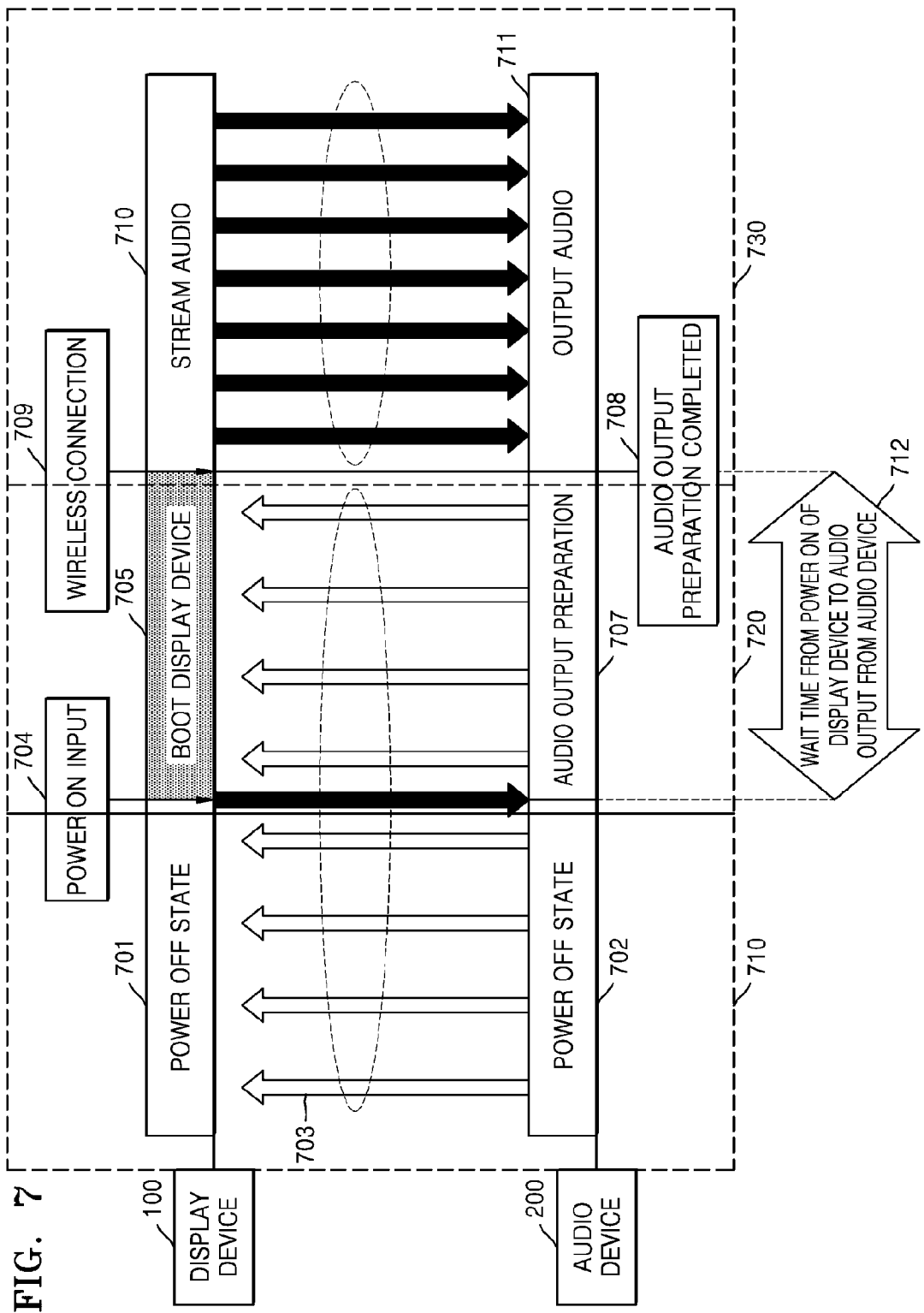
FIG. 7 is a diagram showing a delay time from power ON of a display device to audio output of an audio device in a case in which a wake-up signal according to an exemplary embodiment is applied.

FIG. 7 is a diagram showing a delay time from power ON of a display device to audio output of an audio device in the case in which a wake-up signal according to an exemplary embodiment is applied.

Figure 8:
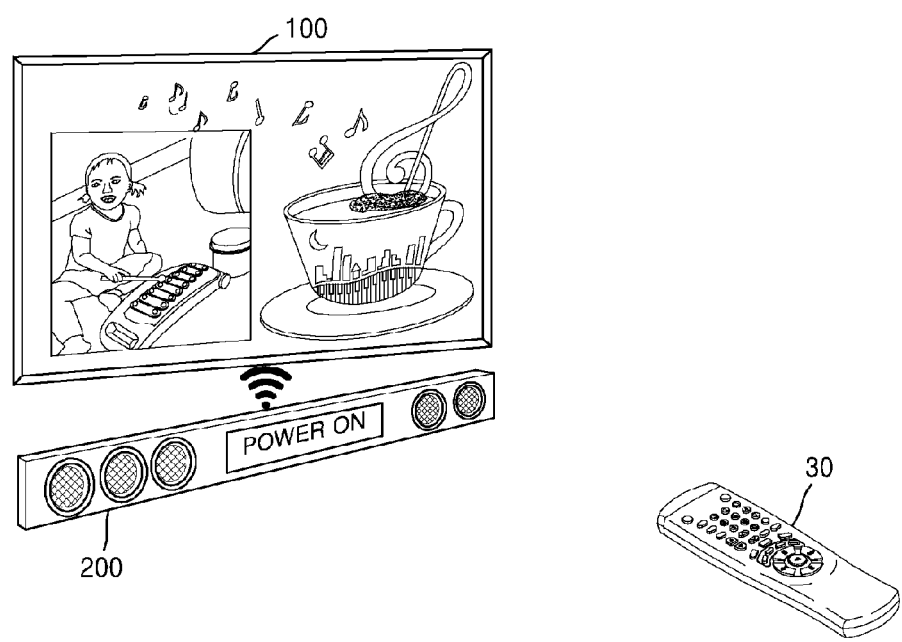
FIG. 8 is a diagram showing that a power ON message is displayed on an audio device when the audio device and a display device are wirelessly connected to each other.

FIG. 8 is a diagram showing that a power ON message is displayed at an audio device when the audio device and a display device are wirelessly connected to each other.

Figure 9:
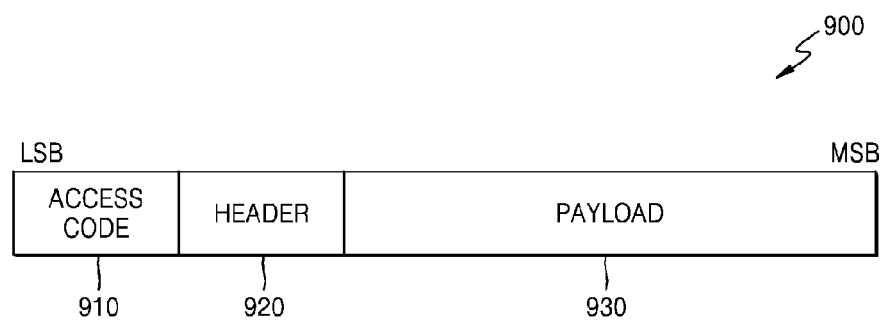
FIG. 9 is a diagram showing an example of BLUETOOTH® packets.

FIG. 9 is a diagram showing an example of BLUETOOTH® packets.

Figure 10:
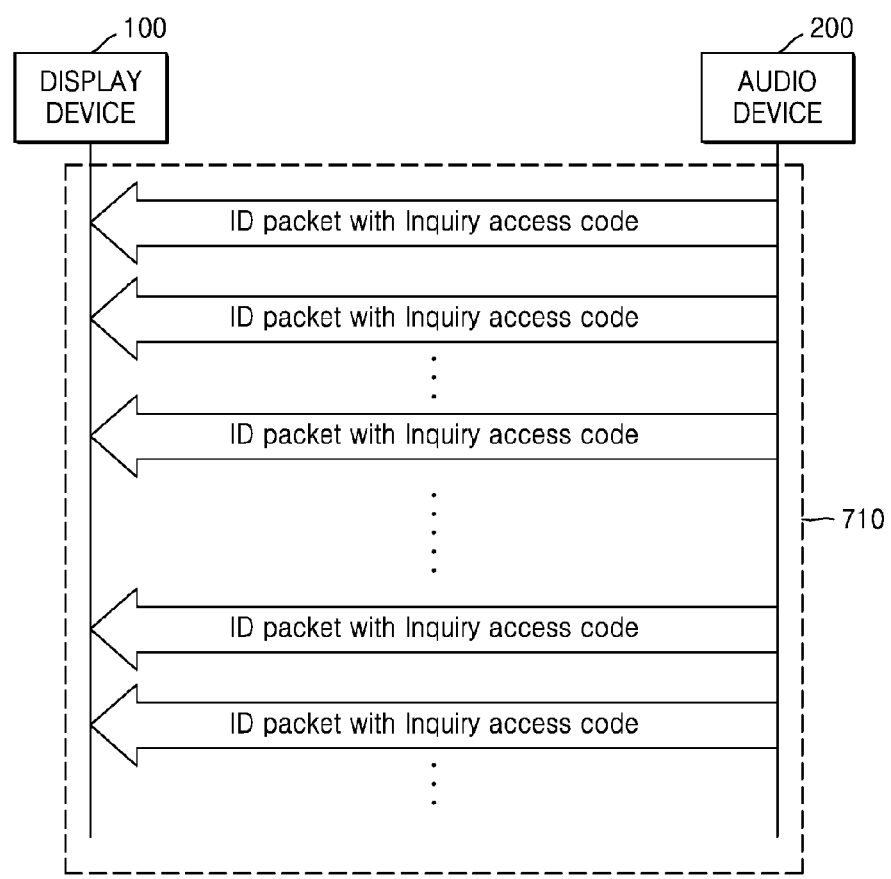
FIG. 10 is a detailed flowchart showing a block in which a display device transmits and receives signals for controlling power of an audio device.

FIG. 10 is a detailed flowchart showing a block 710 in which a display device transmits and receives signals for controlling power of an audio device.

Figure 11:
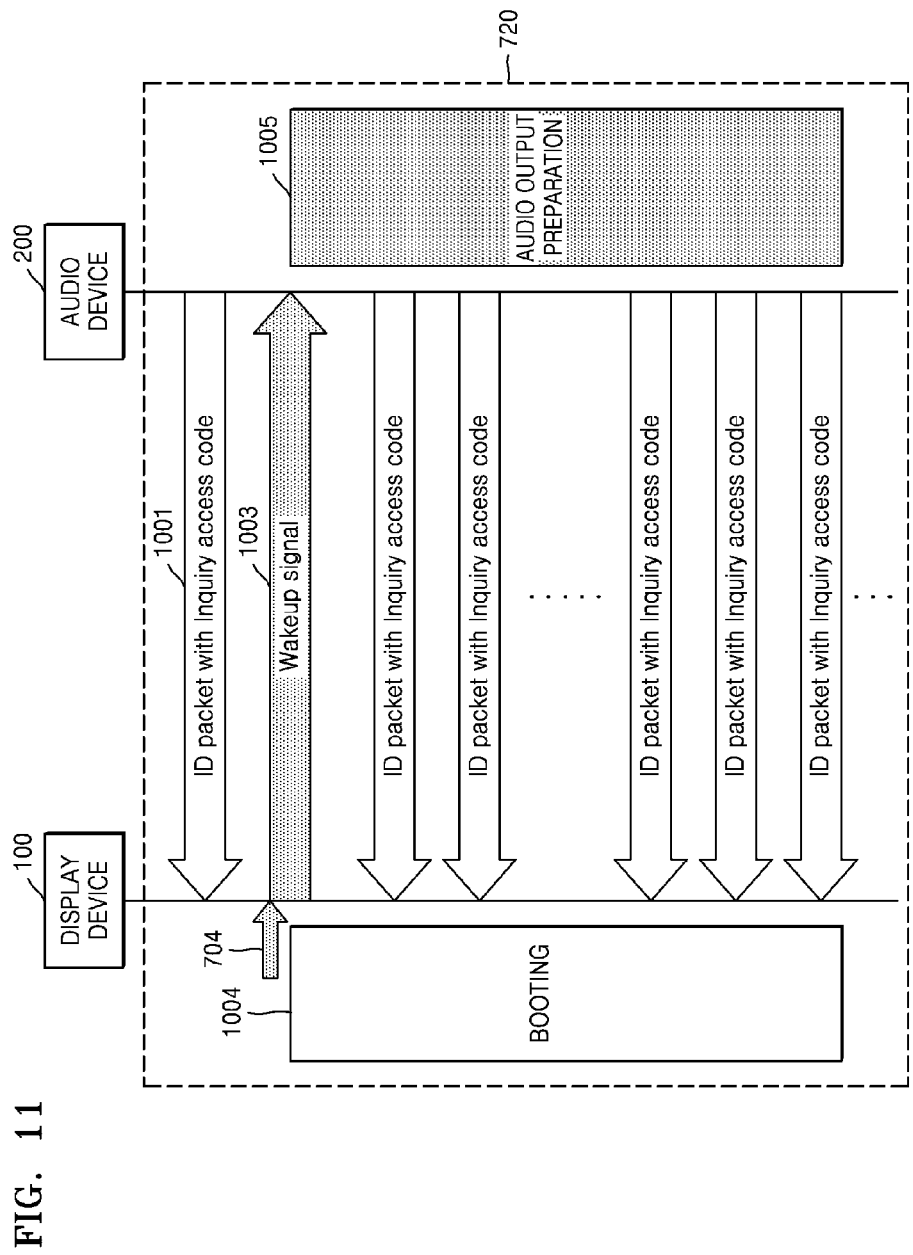
FIG. 11 is a detailed flowchart showing a block in which a display device transmits and receives signals for controlling power of an audio device.

FIG. 11 is a detailed flowchart showing a block 720 in which a display device transmits and receives signals for controlling power of an audio device.

Figure 12:
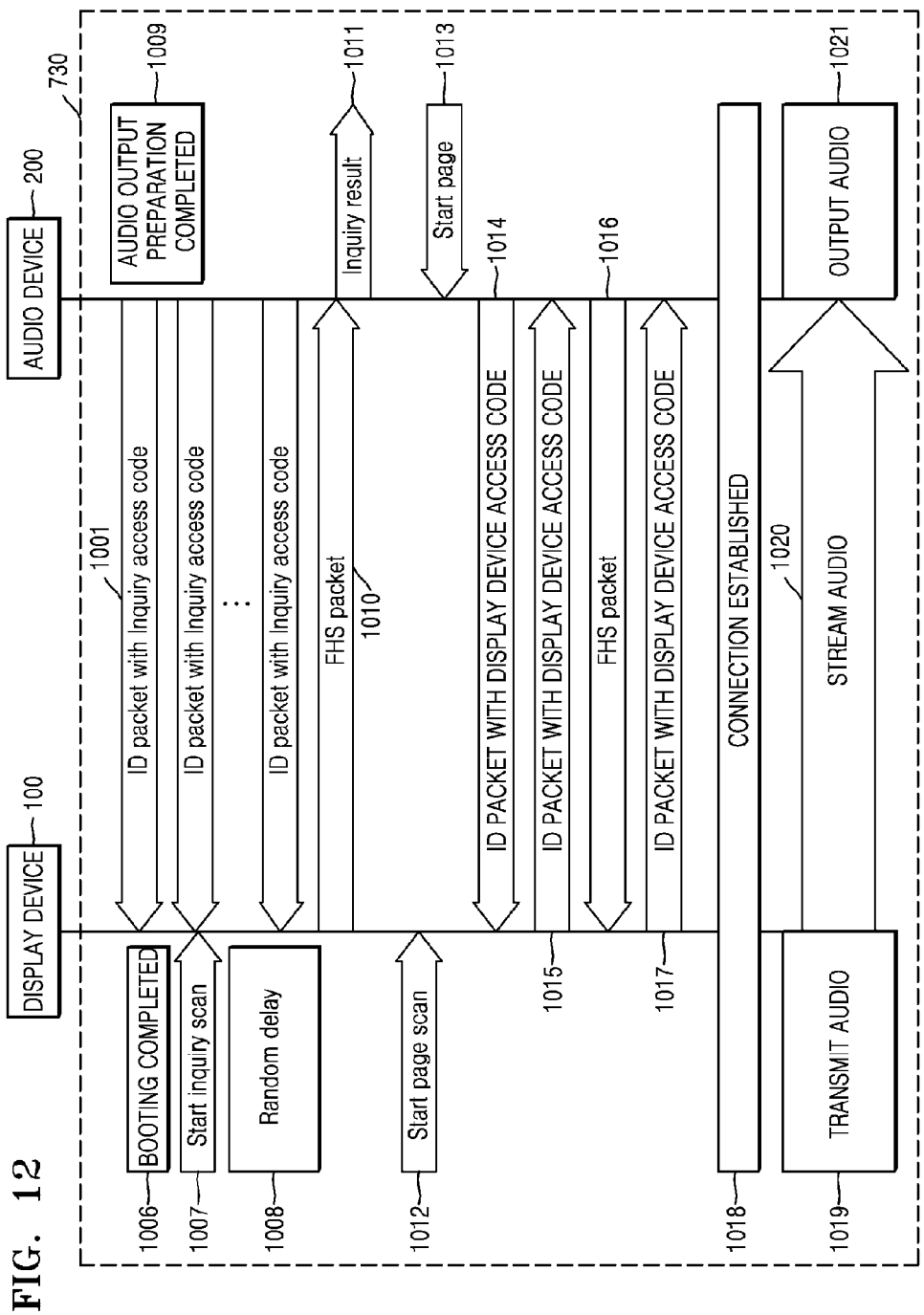
FIG. 12 is a detailed flowchart showing a block in which a display device transmits and receives signals for controlling power of an audio device.

FIG. 12 is a detailed flowchart showing a block 730 in which a display device transmits and receives signals for controlling power of an audio device.

Referring to FIGS. 5 through 12, an exemplary embodiment will be described in detail.

Referring to FIG. 5, in operation 510, the audio device attempts a connection of a display device in a standby state.

The standby state of the audio device refers to a state in which power to most components of the audio device other than communication part is turned off. The standby state allows the audio device to communicate with external devices by maintaining power to the communication part. The term 'standby state of the audio device' may be used synonymously with 'power OFF state of the audio device' in the present specification. Since a state in which the audio device is not able to output audio may be recognized by a user as a state equivalent to the power OFF state, the standby state may also be referred to as the power OFF state.

Referring to FIGS. 1, 2, and 7, both the display device 100 and the audio device 200 are in a power OFF state. An indicator of the display device 100 is also turned off. The indicator window 201 or the indicator 201a of the audio device 200 is also turned off.

According to an exemplary embodiment, before the display device 100 and the audio device 200 are turned off, the display device 100 and the audio device 200 are connected to (paired with) each other. Therefore, the audio device 200 attempts a connection to the display device 100 even after a previous connection is terminated and the audio device 200 is turned off. Here, when the audio device 200 in OFF state, only the communicator 230 may be operated as the power supply 290 does not supply power to the other components including the controller 210 and supplies power only to the communicator 230. In other words, in the power OFF state of the audio device 200, the controller 210, the display 270, and the internal speaker 275 are not operated, but the communicator 230 of the audio device 200 receives power from the power supply 290 and attempts a connection to the display device 100.

Alternatively, according to another exemplary embodiment, in the power OFF state of the audio device 200, the power supply 290 of the audio device 200 may supply power to at least a portion of the controller 210 and the communicator unit 230 and may not supply power to the other components. Both functions that is, a function for connecting the audio device 200 to the display device 100 and a control function to perform an operation in response to reception of a wake-up signal in the communicator 230, may be embodied in the communicator 230, or may be distributed to the communicator 230 and the controller 210.

In a standby state, the controller 210 of the audio device 200 may periodically inquire to discover the display device 100 via the communicator 230. The audio device 200 may inquire at the time interval of 1.28 sec. An inquiry interval of the audio device 200 may include successive inquiries or inquiries at the interval of 2.56 sec. The audio device 200 may not supply power to components (e.g., the display 270 and the internal speaker 275) other than a component for periodic scanning. By doing so, the audio device 200 may maintain and/or update a list of nearby BLUETOOTH® devices that are in discovery mode as well as devices paired to the device in the standby state.

The components to which power is not supplied may vary in correspondence to functions and structures of the audio device 200.

Referring to FIG. 7, in a block 710, both the display device 100 and the audio device 200 are in power OFF states 701 and 702, and the audio device 200 in the power OFF state 702 transmits a signal 703 for attempting a connection to the display device 100. Communication techniques used by the audio device 200 to attempt a connection to the display device 100 includes close-distance communication techniques, such as Wi-Fi and BLUETOOTH®.

FIG. 10 shows a signal flow at the block 710 in which the audio device 200 attempts a connection to the display device 100 by using a BLUETOOTH® profile according to an exemplary embodiment.

Referring to FIG. 10, the communicator 230 of the audio device 200 in the power OFF state periodically inquires about the display device 100 by using a BLUETOOTH® profile. Generally, in a BLUETOOTH® communication, a connection between two devices is established by inquiry and paging. If a device that desires to establish a connection does not know anything about surrounding devices, it is necessary for the device to perform both inquiry and paging. However, if the device has information regarding another device, it is not necessary to inquire and a link may be established by performing paging only. An inquiring device repeatedly sends out inquiry messages and waits for inquiry responses. A BLUETOOTH® device, which is available for discovery (i.e., is a discoverable device), receives such an inquiry request, and transmits a response. In the block 710, since the display device 100 is in the power OFF state, the display device 100 is not in a discoverable state and is unable to transmit an inquiry response. Therefore, the audio device 200 may periodically transmit inquiry messages to the display device 100.

In other words, the communicator 230 of the audio device 200 may transmit an identifier (ID) packet including an inquiry access code for an inquiry to the display device 100.

In operation 520, the display device 100 receives a user input corresponding to power ON of the display device 100.

Referring to FIGS. 1, 2, and 7, the user input corresponding to power ON of the display device 100 may include a user input provided by using the remote control device 30, a power key of panel keys arranged on a side surface or a rear surface of the display device 100, the user's voice received by the microphone 140, the user's motion detected by the light receiver 150, or remote control via an application (e.g., a remote control application) installed on an external device (e.g., a smart phone), for example.

When the power on/off button 31 of the remote control device 30 is selected by a user from among a plurality of user input options, a controller of the remote control device 30 may output a control signal (e.g., a signal corresponding to power ON of the display device 100) to the display device 100 by using a communication unit or a light output unit.

According to an exemplary embodiment, selection of a key may refer to press of the key or a touch or contact to the key for a set time period. The set time period may be 200 ms (may be changed in settings), for example.

The controller 110 of the display device 100 may turn on the display device 100 in correspondence to a control signal received via the communicator 130 or the light receiver 150. Furthermore, the display device 100 may display a text, an icon, or a symbol corresponding to power ON of the display device 100 on a display screen of the display device 100 for a set time period (e.g., 800 ms; may be changed in settings).

In operation 530, the display device 100 transmits a wake-up signal, which instructs the audio device 200 to initiate an audio output preparing operation, to the audio device 200.

Referring to FIGS. 1, 2, and 7, the controller 110 of the display device 100 transmits the received wake-up signal (e.g., a control packet) corresponding to power ON to the audio device 200 via the communicator 130 separately from an audio stream. For example, a logical link control and adaptation (L2CAP) connection request packet, which is an asynchronous connection-less (ACL) connect request packet (a BLUETOOTH® profile), as the wake-up signal. According to another exemplary embodiment, in a BLE (BT 4.0) environment, a generic attribute profile (GATT) connect request may be used as the wake-up signal. According to another exemplary embodiment, pre-wake data in a LE advertisement packet may be used as the wake-up signal.

The display device 100 has information regarding a state in which the display device 100 was previously paired with the audio device 200, and thus the display device 100 may transmit the wake-up signal to the audio device 200 by using the information regarding the previous pairing, that is, address information regarding the audio device 200.

In operation 540, the display device 100 initiates a booting operation. However, one of ordinary skill in the art will understand that the operation 540 is not necessarily performed after the operation 530, and the operations 530 and the 540 may be performed almost simultaneously.

Referring to FIGS. 1, 2, and 7, when a power ON input is received in power OFF state, the controller 110 of the display device 100 initiates an operation of booting the display device 100.

In power ON state, an indicator arranged at the center of the lower bezel 10 of the display device 100 may emit a colored light, a white light, or a gray light.

The booting operation refers to an operation in which the power supply 190 supplies power to respective components of the display device 100 and initializes the display device 100.

In operation 550, the audio device 200 receives a wake-up signal from the display device 100.

Referring to FIGS. 1, 2, and 7, the communicator 230 of the audio device 200 receives the wake-up signal from the display device 100 under the control of the controller 210.

When the communicator 230 of the audio device 200 receives the wake-up signal when the audio device 200 is in power OFF state, the wake-up signal is recognized as an instruction for the audio device 200 to initiate an audio output preparing operation. According to an exemplary embodiment, a portion of the communicator 230 may include a definition indicating that the wake-up signal is an instruction for the audio device 200 to initiate an audio output preparing operation. According to another exemplary embodiment, a portion of the controller 210 may be in ON state, and the portion of the controller 210 may interpret the wake-up signal as an instruction for the audio device 200 to initiate an audio output preparing operation.

In operation 560, the audio device 200 initiates an audio output preparing operation based on the received wake-up signal.

Referring to FIG. 7, the block 720 shows that the display device 100 receives a power ON input and initiates an operation of booting the display device 100 and an audio output preparing operation of the audio device 200.

In the block 720, when a power on input 704 is received when the display device 100 is in the power OFF state 701, the display device 100 initiates an operation 705 of booting the display device 100 and transmits a wake-up signal 706 to the audio device 200. Once the audio device 200 receives the wake-up signal 706 in the power OFF state 702, the audio device 200 initiates an audio output preparing operation 707 of the audio device 200. The wake-up signal 706 may be transmitted to the audio device 200 before the booting operation of the display device 100 is completed. The audio output preparing operation 707 may be mainly performed by the controller 210 of the audio device 200, where the communicator unit 230 of the audio device 200 continues transmitting a connection request 703 to the display device 100. The connection request 703 may include an ID packet with an inquiry access code.

The audio output preparing operation may include enabling an audio amplifier circuit of the audio device 200 to be fully powered and stabled. When the power level of the audio amplifier circuit is stabled, the audio device 200 may recognize that the audio output preparing operation is completed.

FIG. 11 shows a signal flow between the audio device 200 and the display device 100 via a BLUETOOTH® profile in the block 720.

Referring to FIG. 11, when the display device 100 receives a power ON input 704 in power OFF state, the communicator unit 230 of the audio device 200 initiates an operation 1004 of booting the display device 100 in response thereto and transmits a wake-up signal 1003 to the audio device 200. Once the audio device 200 receives the wake-up signal 1003, the audio device 200 initiates an audio output preparing operation 1005 in response to the wake-up signal 1003. Aside from the reception of the wake-up signal 1003 and the audio output preparing operation 1005 of the audio device 200, the audio device 200 continues to periodically transmit ID packets including inquiry access codes to the display device 100 according to a BLUETOOTH® profile.

For example, a ACL connect request packet may be used as the wake-up signal 1003.

In operation 570, a wireless connection between the display device 100 and the audio device 200 is established.

When the display device 100 is booted and turned on, the display device 100 is in a communicable state. When the display device 100 receives a connection request from the audio device 200 in the communicable state, the display device 100 may respond to the connection request, and thus the display device 100 and the audio device 200 are connected to each other.

When the display device 100 and the audio device 200 are wirelessly connected to each other according to an exemplary embodiment, a message 'Power ON' may be displayed at the display 270 of the audio device 200 as shown in FIG. 9.

Referring to FIG. 12, an operation of establishing a wireless connection between the display device 100 and the audio device 200 by using a BLUETOOTH® profile will be described below.

Referring to FIG. 12, the display device 100 is booted (operation 1006) and initiates inquiry scanning. When a device performing inquiry scanning receives an inquiry, there is a delay time from 0 ms to about 640 ms and, when the device receives another inquiry, the device transmits an inquiry reply, which is a frequency hopping synchronization (FHS) packet including information regarding the device, to an inquiring device. The reason for the delay from 0 ms to about 640 ms is that, since an inquiry is performed by using an inquiry access code to be received by all surrounding nodes, if a plurality of devices are in an inquiry scanning state, the devices receive inquiries and immediately send out inquiry replies, and thus reply messages may collide with one another. When an inquiry and an inquiry scanning are performed, an inquiring device may obtain information regarding a device that sent an inquiry reply.

Referring to FIG. 12, when the display device 100 receives an inquiry from the audio device 200 after the display device 100 initiates inquiry scanning, the display device 100 delays a time by a random delay 1008, and then the display device 100 transmits a frequency hopping synchronization (FHS) packet 1010 to the audio device 200. The audio device 200 obtains an inquiry result 1011 based on the reception of the FHS packet 1010.

Paging/page scanning are performed in a similar regard as the inquiry/inquiry scanning. If a first device desires to establish a connection to a particular second device, the first device enters a paging mode and transmits a page message to the second device. When the second device is in a page scanning mode and receives the page message, a connection is established between the two devices. A difference between the inquiry and the paging is that, since an inquiry is performed to obtain information regarding surrounding devices, all devices may transmit inquiry replies, whereas, since paging is performed to transmit a message to a particular device, a reply is immediately transmitted without a time delay during page scanning. Therefore, a time elapsed for paging is significantly shorter than a time elapsed for an inquiry. Generally, a paging device becomes a master on a piconet, whereas a page scanning device becomes a slave.

As shown in FIG. 12, a connection is established by performing paging/page scanning immediately after an inquiry/inquiry scanning are performed.

Furthermore, once the audio device 200 receives the inquiry result 1011, the audio device 200 transmits an ID packet 1014 with an access code of the display device 100 to the display device 100, thereby initiating paging (operation 1013).

The display device 100, which received the ID packet 1014 with the access code of the display device 100, transmits an ID packet 1015 with an access code of the display device 100 to the audio device 200. In response thereto, the audio device 200 transmits a FHS packet 1016 to the display device 100. The display device 100, which received the FHS packet 1016, transmits an ID packet 1017 with an access code of the display device 100 to the audio device 200. Therefore, a BLUETOOTH® connection between the display device 100 and the audio device 200 is established (operation 1018).

In operation 580, audio is streamed from the display device 100 to the audio device 200, and the audio device 200 outputs audio.

Referring to FIGS. 1, 2, and 7, the display device 100 streams audio to the audio device 200 that is wirelessly connected to the display device 100 (e.g., via BLUETOOTH®). The display device 100 fixed to a wall via a mount unit (or supported by a stand below the display device 100) wirelessly outputs audio to the audio device 200 via the communicator 130.

The controller 110 of the display device 100 may output high quality audio to the audio device 200 by using an advanced audio distribution profile (A2DP) of the BLUETOOTH®.

According to an exemplary embodiment, when the display device 100 and the audio device 200 are wirelessly connected to each other, a message 'Power ON' may be displayed at the display 270 of the audio device 200 as shown in FIG. 8. In related art, since an audio output preparing operation of an audio device is initiated after a display device and the audio device are wirelessly connected to each other, the audio device is able to output audio after a certain time period since a power ON message is displayed at the display 270, that is, after an audio output preparing operation is completed. However, according to an exemplary embodiment, when the display device 100 and the audio device 200 are wirelessly connected to each other and the display device 100 transmits an audio stream to the audio device 200, an audio output preparing operation 100 of the audio device 200 is already completed, and thus the audio device 200 is able to output received audio data without a time delay after a power ON message is displayed at the display 270.

Referring to FIG. 9, a BLUETOOTH® packet 900 for transmitting an audio stream includes an access code (72 bits) 910, a header (54 bits) 920, and a payload (from 0 to 2,745 bits) 930. An access code 910 is used for determining validity of a packet. The header 920 includes a media access control (MAC) address and a packet type information. The payload 930 includes data to be transmitted, where size of the payload 930 is changed according to type of a packet to be transmitted. High quality audio to be transmitted is included in the payload 930 of the packet 900.

The controller 110 may output audio data to the audio device 200 by using not only the AD2P profile, but also other BLUETOOTH® profiles. Wireless communication protocols may include the BLUETOOTH® 132 or another close-distance communication protocol.

The audio device 200 outputs audio received from the display device 100 via the internal speaker 275. The display device 100 may also output audio via the internal speaker 176.

Hereinafter, referring to FIGS. 6 and 7, an exemplary embodiment of the inventive concept using a wake-up signal will be compared to an exemplary embodiment without a wake-up signal.

FIG. 6 shows an audio output method without a wake-up signal.

Referring to FIG. 6, when a display device 620 and an audio device 630 are in power OFF states, the audio device 630 continuously transmitting connection request signals 603 to the display device 620. When the display device 620 receives a power ON input 604 from a user, the display device 620 performs a booting operation 605. Next, when the display device 620 is booted, the display device 620 is in a connectable state to respond to the connection request signal 603 from the audio device 630, and a wirelessly connection is established (operation 606).

When the display device 620 and the audio device 630 are wirelessly connected to each other, the display device 620 transmits an audio stream to the audio device 630 (operation 608). However, since the audio device 630 initiates an audio output preparing operation from a time point at which the audio device 630 is wirelessly connected to the display device 620, when the audio device 630 receives the audio stream from the display device 620, the audio device 630 is not prepared to output the received audio stream. Therefore, the audio stream received from the display device 620 may not be output while the audio device 630 is preparing to output the audio stream, and thus the audio stream may be lost. Next, from a time point at which the audio device becomes prepared to output the audio stream, the audio device 630 may output the audio stream received from the display device 620 (operation 610).

Therefore, in the case of not employing a wake-up signal according to the exemplary embodiment described above, a wait time from power ON of the display device 620 to an audio output of the audio device 630 may be required as indicated by the reference numeral 611 in FIG. 6, and the audio device 630 is unable to output and lose an audio stream received from the display device 620 during an audio output preparing operation 607. Therefore, a user may watch video reproduced by the display device 620 at the time of the wireless connection (operation 606) but may not hear audio during the audio output preparing operation 607 and may hear audio after a certain time delay.

FIG. 7 shows an audio output method employing a wake-up signal according to the inventive concept.

Referring to FIG. 7, when the display device 100 and the audio device 200 are in power OFF states, the audio device 200 continuously transmits connection request signals 703 to the display device 100. When the display device 100 receives the power ON input 704 from a user, the display device 100 performs the booting operation 705 and transmits the wake-up signal 706 to the audio device 200. The audio device 200, which received the wake-up signal 706, performs the audio output preparing operation 707. Next, when the display device 100 is booted, the display device 100 is in a connectable state to respond to the connection request signal 703 from the audio device 200, and a wirelessly connection is established (operation 709).

When the display device 100 and the audio device 200 are wirelessly connected to each other, the display device 100 transmits an audio stream to the audio device 200 (operation 710). Since the audio device 200 has completed the audio output preparing operation 707 according to the wake-up signal 706, the audio device 200 is able to output the audio stream received from the display device 100 immediately (operation 711).

Therefore, in the case of employing a wake-up signal according to the exemplary embodiment, a wait time from power ON of the display device 100 to an audio output of the audio device 200 may be needed as indicated by the reference numeral 712 in FIG. 7, and the user may simultaneously watch video reproduced by the display device 100 and hear audio without a time delay at the time of the wireless connection (operation 709). Although FIG. 7 shows that the same time is elapsed for the booting operation 705 of the display device 100 and the audio output preparing operation 707 of the audio device 200, the time period elapsed for the audio output preparing operation 707 may be shorter than the time period elapsed for the booting operation 705 in reality. Therefore, the audio device 200 may wait in an audio output standby state until the audio device 200 is wirelessly connected to the display device 100.

As described above, according to the one or more of the above exemplary embodiments, a TV and a wireless speaker device may be quickly linked to each other.

While not restricted thereto, an exemplary embodiment may be embodied as program commands executable by various computer means and may be recorded on a computer-readable recording medium. The computer-readable recording medium may include program commands, data files, data structures, and the like separately or in combinations. The program commands to be recorded on the computer-readable recording medium may be specially designed and configured for embodiments of the present invention or may be well-known to and be usable by one of ordinary skill in the art of computer software. Examples of the computer-readable recording medium include a magnetic medium such as a hard disk, a floppy disk, or a magnetic tape, an optical medium such as a compact disk-read-only memory (CD-ROM) or a digital versatile disk (DVD), a magneto-optical medium such as a floptical disk, and a hardware device specially configured to store and execute program commands such as a ROM, a random-access memory (RAM), or a flash memory. Examples of the program commands are advanced language codes that can be executed by a computer by using an interpreter or the like as well as machine language codes made by a compiler.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An electronic device comprising:
a communication interface configured to wirelessly connect the electronic device to an external device, and
a controller configured to:
in response to an input to turn on power of the electronic device, start a booting operation of the electronic device, and control the communication interface to transmit a wake-up signal to the external device in a standby state in which the external device transmits a request signal for requesting a connection with the electronic device, the wake-up signal instructing the external device in the standby state to supply a power to speaker components of the external device before a connection of the electronic device and the external device is completed;
in response to completion of the booting operation, transmit, a response signal for responding to the request signal, to the external device in the standby state to perform the connection with the external device; and
in response to completion of the connection with the external device, transmitting audio signal to the external device, the audio signal being used to be output by the speaker components of the external device.

2. The electronic device of claim 1, wherein the controller periodically receives the request signal for requesting a connection with the electronic device from the external device via the communication interface while the external device is in the standby state.

3. An audio device comprising:
a communication interface configured to wirelessly connect the audio device to an electronic device; and
a controller configured to:
control the communication interface to transmit a request signal for requesting a connection with the electronic device,
receive a wake-up signal from the electronic device starting a booting operation of the electronic device in response to an input to turn on power of the electronic device,
in response to the wake-up signal, supplying a power to speaker components of the external device before a connection of the electronic device and the external device is completed,
in response to completion of the booting operation of the electronic device, receiving, a response signal for responding to the request signal, from the electronic device, to perform the connection with the electronic device, and
receiving an audio signal from the external device, the audio signal being used to be output by the speaker components of the external device.

4. The audio device of claim 3, wherein the controller is further configured to periodically transmit the request signal requesting a connection with the electronic device via the communication interface while the audio device is in the standby state.

5. The audio device of claim 4, wherein the controller is further configured to display, on a display of the audio device, a message notifying that the audio device is turned on, in response to the response signal.

6. A method of controlling an external device by an electronic device, the method comprising:
in response to an input to turn on power of the electronic device, starting a booting operation of the electronic device, and transmitting a wake-up signal to the external device in a standby state in which the external device transmits a request signal for requesting a connection with the electronic device, the wake-up signal instructing the external device in the standby state to supply a power to speaker components of the external device before a connection of the electronic device and the external device is completed,
in response to completion of the booting operation, transmitting, a response signal for responding to the request signal, to the external device in the standby state to perform the connection with the external device, and
in response to completion of the connection with the external device, transmitting audio signal to the external device, the audio signal being used to be output by the speaker components of the external device.

7. The method of claim 6, further comprising, periodically receiving the request signal for requesting the connection with the electronic device from the external device while the external device is in the standby state.

8. A method of controlling power of an audio device, the method comprising:

transmitting a request signal for requesting a connection with an electronic device, in a standby state of the audio device;

receiving a wake-up signal from the electronic device starting a booting operation of the electronic device in response to an input to turn on power of the electronic device;

in response to the wake-up signal, supplying a power to speaker components of the audio device before a connection of the electronic device and the audio device is completed;

in response to completion of the booting operation of the electronic device, receiving, a response signal for responding to the request signal, from the electronic device, to perform the connection with the electronic device; and receiving an audio signal from the audio device, the audio signal being used to be output by the speaker components of the audio device.

9. The method of claim 8, further comprising periodically transmitting the request signal to the electronic device while the audio device is in the standby state.

10. The method of claim 9, further comprising displaying, on a display of the audio device, a message notifying that the audio device is turned on in response to the response signal being received in response to the request signal.

* * * * *